(12) United States Patent
DiMarco et al.

(10) Patent No.: US 7,264,316 B2
(45) Date of Patent: Sep. 4, 2007

(54) SHIELD FOR WHEEL ASSEMBLIES

(75) Inventors: Robert DiMarco, Rochester Hills, MI (US); Wesley G. Morris, Dearborn, MI (US)

(73) Assignee: McKechnie Vehicle Components (USA), Inc., Troy, MI (US)

( * ) Notice: Subject to any disclaimer, the term of this patent is extended or adjusted under 35 U.S.C. 154(b) by 55 days.

(21) Appl. No.: 10/928,384

(22) Filed: Aug. 27, 2004

(65) Prior Publication Data

US 2006/0043781 A1    Mar. 2, 2006

(51) Int. Cl.
   *B60B 7/01* (2006.01)
(52) U.S. Cl. ............... 301/37.105; 301/37.101; 301/37.24
(58) Field of Classification Search ........... 301/37.11, 301/37.24, 37.35, 37.36, 37.43, 37.105, 37.106, 301/37.107, 6.91, 6.3
   See application file for complete search history.

(56) References Cited

U.S. PATENT DOCUMENTS

| | | | |
|---|---|---|---|
| 1,858,228 A * | 5/1932 | Lyon ............... 152/406 |
| 1,993,813 A * | 3/1935 | Rosa et al. ............... 301/37.24 |
| 2,121,146 A * | 6/1938 | Frank ............... 301/37.371 |
| 2,380,649 A * | 7/1945 | Hollerith ............... 152/406 |
| 3,517,968 A * | 6/1970 | Tully et al. ............... 301/37.24 |
| 3,570,093 A * | 3/1971 | Gollwitzer ............... 29/894.38 |
| 3,726,566 A | 4/1973 | Beith |
| 4,341,425 A | 7/1982 | Streicher et al. |
| 5,368,370 A | 11/1994 | Beam |
| 5,458,401 A | 10/1995 | Baccman |
| 5,461,779 A | 10/1995 | Beam |
| 5,595,423 A | 1/1997 | Heck et al. |
| 5,664,845 A | 9/1997 | Maloney et al. |
| 5,722,734 A * | 3/1998 | Bennick ............... 301/37.101 |
| 5,829,843 A | 11/1998 | Eikhoff |
| 5,921,634 A | 7/1999 | Eikhoff |
| 6,481,804 B2 | 11/2002 | Tanghetti |
| 2005/0206220 A1* | 9/2005 | Polka ............... 301/37.105 |

* cited by examiner

*Primary Examiner*—Russell D. Stormer
(74) *Attorney, Agent, or Firm*—Butzel Long

(57) ABSTRACT

A shield for wheel assemblies formed of a metal band that is inserted into wheels so as to cover and protect the inner surface of the wheels. The shields can be made from stainless steel and used to protect the inner surfaces of aluminum from damage caused by debris that contact a vehicle braking assembly. The shields are secured in the wheels by a mechanical locking arrangement in which the outer ends of the shields snap-fit along outboard rim flanges of the wheels. Adhesives or sealants can be used to secure the shields to the wheels and to prevent moisture and debris from becoming trapped between the shields and inner surfaces of the wheels.

28 Claims, 4 Drawing Sheets

SHIELD FOR WHEEL ASSEMBLIES

TECHNICAL FIELD

The present invention relates to vehicle wheels and more particularly a methods and structures which shield wheels from internal damage caused by stones or other debris. More specifically the present invention is directed to wheel assemblies that include shields that line and protect the inner surfaces of vehicle wheels.

BACKGROUND ART

Vehicle wheels are configured to support tires on outer surfaces between inner and outer rims. In addition, when attached to the hubs of vehicles, vehicle wheels are typically configured so that they extend over and radially surround both vehicle wheel hubs and components of braking assemblies.

Because vehicle braking assemblies are not completely enclosed, debris such as rocks, gravel, sand, dirt, etc. can contact and adversely effect components of the braking assemblies. In some instances stones and/or gravel can become caught in vented brake discs or brake calipers and then grind the inside of a vehicle wheel or can even be projected from a vented brake disc at a high enough velocity to cause structural damage to the inside of a vehicle wheel. In each case, wheel failure can occur.

In the case of aluminum wheels (which are generally much more expensive that steel wheels), the damage caused by debris can be devastating. Rocks and gravel thrown from vented brake discs have been known to cause aluminum wheels to explode.

Although current vehicle designs are better at preventing access and ingress of debris into vehicle braking assemblies, the need to vent braking systems in order to dissipate heat generated during the braking of a vehicle precludes the ability to completely seal braking systems from all debris.

Accordingly, a wheel assembly designed to protect wheels from damage caused by debris would be a welcomed advance in the art of wheel assemblies.

Such a wheel assembly and shielding structure is provided by the present invention.

DISCLOSURE OF THE INVENTION

According to various features, characteristics and embodiments of the present invention which will become apparent as the description thereof proceeds, the present invention generally provides a method of shielding the interior of wheels from damage caused by debris which involves securing a metal shield over inner surfaces of the wheels.

In particular, the present invention provides a protective shield for an inner surface of a wheel which includes a band of metal that lines at least an annular portion of the inner surface of the wheel to shield the inner surface of the wheel; and at least one of a mechanical locking arrangement and a chemical agent which secures the shield along the inner surface of the wheel.

The present invention also provides a wheel assembly that includes:

a wheel having an inner annular surface and an inboard rim flange;

a shield that comprises a band of metal that is configured to line at least a portion of the inner annular surface of the wheel to shield the inner annular surface of the wheel; and at least one of a mechanical locking arrangement and a chemical agent which secures the shield along the inner annular surface of the wheel.

The present invention also provides a method of shielding an inner surface of a wheel which involves:

providing a wheel having an inner annular surface and an inboard rim flange;

providing a shield that comprises a band of metal that is configured to line at least a portion of the inner annular surface of the wheel to shield the inner annular surface of the wheel; and securing the shield along the inner annular surface of the wheel by at least one of a mechanical locking arrangement and a chemical agent.

The present invention further provides a method of forming a wheel assembly which comprises:

providing a wheel having an inner annular surface and an inboard rim flange;

providing a shield that comprises a band of metal that is configured to line at least a portion of the inner annular surface of the wheel to shield the inner annular surface of the wheel; and securing the shield along the inner annular surface of the wheel by at least one of a mechanical locking arrangement and a chemical agent.

The present invention moreover provides a metal shield that can be used in conjunction to previously know wheels by securing the metal shield along an inner surface of the wheels by at least one of a mechanical locking arrangement and a chemical agent.

BRIEF DESCRIPTION OF DRAWINGS

The present invention will be described with reference to the attached drawings which are given as non-limiting examples only, in which.

BEST MODE FOR CARRYING OUT THE INVENTION

The present invention is directed to wheel assemblies that include shields that line and protect inner surfaces of vehicle wheels. According to one embodiment of the present invention, the shields are designed to protect aluminum wheels and can be made of stainless steel. In alternative embodiments of the invention, the shields can be made from any durable metal and can be used to protect wheels made from materials other than aluminum.

The shields of the present invention are designed and configured to prevent debris abrasion and impact damage from occurring on the inside of wheel assemblies. Accordingly, the shields are configured to cover the inner surfaces of wheel assemblies and are made from metal sheets that are conformed to line a portion of the inner surface of wheel assemblies.

In order to secure the shields in the wheel assemblies, the wheels and shields are configured to cooperate and provide a mechanical locking arrangement in which the outer edge of the shields snap-fit into a catch structure provided in the outer edge of the wheels. In addition to the mechanical locking arrangement, an adhesive or sealant can be applied between the shields and the wheels. The adhesive or sealant can help secure the shields in place and can otherwise prevent debris and moisture from entering between the shields and wheels.

The shields can have a width which is wide enough to cover any portion and preferably most if not all of the surface area of wheels that is susceptible to debris abrasion and impact damage. For example, the shields can have a width that extends from that back of a spider of a wheel assembly to the inboard rim of a wheel. Shorter widths are possible. For shields that include the rim locking mechanisms discussed below, the width of the shields limit how far the shields extend into the wheel assemblies. Since the shields are intended to block and absorb or distributed the impact of debris that would otherwise strike the inner surface of wheels, it is not necessary that the entire surface areas of the shields be in fixed direct surface to surface contact with the wheels. It is only necessary that the mechanical locking assemblies and any adhesives or sealants sufficiently secure the shields to the wheels so they do not rattle or become detached from the wheels. In addition, it is possible to provide a clearance space between the shields and wheel at least in some areas to allow the shields to absorb debris impact.

The shields of the present invention can comprise one-piece metal bands that are either preformed before being inserted and fixed to a wheel assembly or conformed into an annular shape as they are inserted into a wheel assembly. It is also possible according to the present invention to have the shield comprise multiple-piece elements that overlap, abut or are in close proximity to one another.

Figure 1:
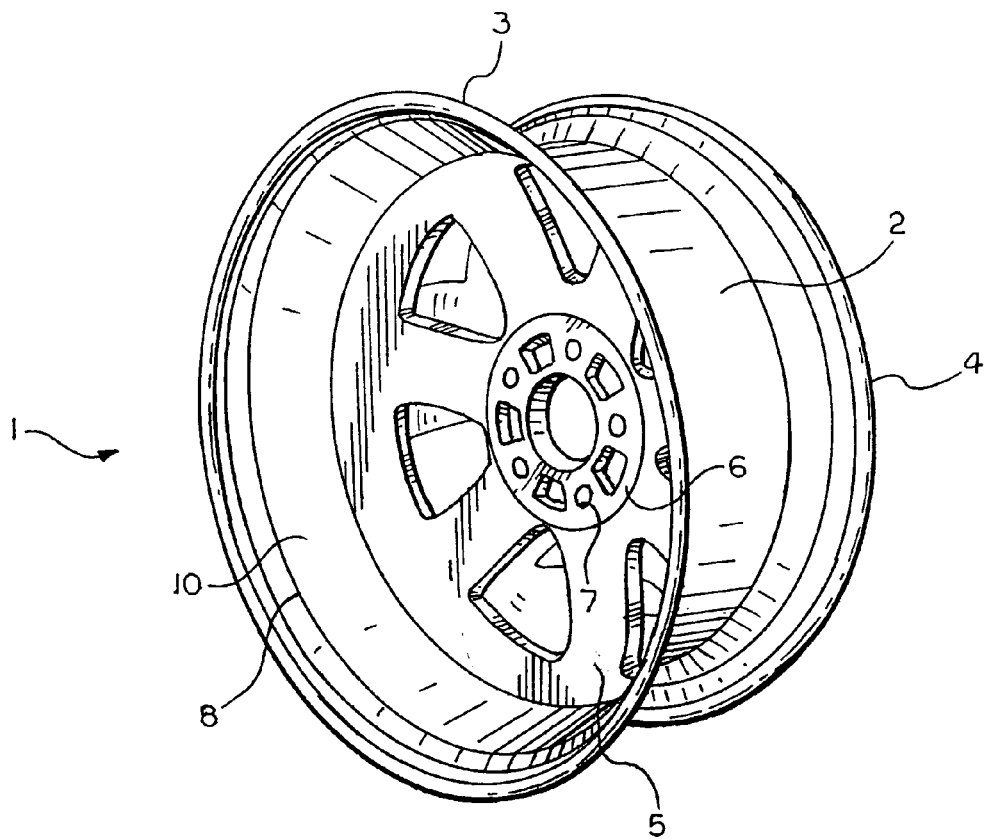
FIG. 1 is a perspective view of a wheel assembly that includes a shielding structure according to one embodiment of the present invention.

FIG. 1 is a perspective view of a wheel assembly that includes a shielding structure according to one embodiment of the present invention. FIG. 1 is a view of what is normally termed the inboard side of a wheel which is based upon the orientation of a wheel in reference to it being mounted on a vehicle. In the present application reference to the shields out from the wheel or the outer edge of the shield will refer to what would normally be the inboard direction if the wheel were mounted to a vehicle. It is also noted that the terms "wheel" as used herein encompasses a wheel and any components attached to the outboard face of the wheel including caps, and/or decorative appliques. Generally, the term "wheel assembly" is used to refer to assemblies of wheels that include the shields of the present invention.

The wheel 1 shown in FIG. 1 includes a mounting rim 2 which extends between inboard and outboard rim flanges 3 and 4 respectfully. In use, a tire is mounted on the mounting rim 2 of the wheel 1 by engagement of the beads of the tire with the inboard and outboard rim flanges 3 and 4. The wheel 1 depicted in FIG. 1 includes a number of spokes 5 which extend radially from a central hub area 6 having a plurality of through-holes 7 which are aligned to receive the lug bolts of a vehicle wheel hub assembly (not shown) when the wheel 1 is mounted to a vehicle.

The inboard side of the wheel 1 has a deep recess 8 which allows the mounting rim 2 to extend over the hub and braking assembly of a vehicle (not shown). As can be appreciated, due to the manner in which the mounting rim 2 will be positioned radially outward from a vehicle's braking assembly, rocks, stones, pieces of gravel, etc. thrown from the vehicle's braking assembly under centrifugal force can impact the inner surface of the mounting rim 2 with a considerable amount of force. In order to protect the inner surface of the mounting rim 2, a shield 10 is provided which is covers the inner surface of the mounting rim 2. The shield 10 is a thin sheet of a sturdy material such as stainless steel which is attached to the inner surface of the mounting rim 2 by a suitable adhesive, sealant and/or press- or snap-fit configuration. In the embodiment of the invention depicted in FIG. 1 the width of the shield 10 is less than the width of the inner surface of the mounting rim 2. In this embodiment, the inner surface of the mounting rim 2 could be relatively flat or include a recess in which to receive the shield 10. The shield 10 can be relatively thin. For example, in the case of using stainless steel shields in combination with aluminum wheels the thickness of the stainless steel shields can be about 0.3-1.0 mm thick with a thickness of about 0.5 mm being particularly suitable for purposes of the present invention. It is to be understood that there is no particular upper limit for the thickness of the shields other than foreseeable considerations that have to be taken into account to form and manipulate the shields when inserting and attaching the shields to a wheel. For materials other than stainless steel the thickness of the shields can be varied depending on the strength of any particular material.

Figure 2:
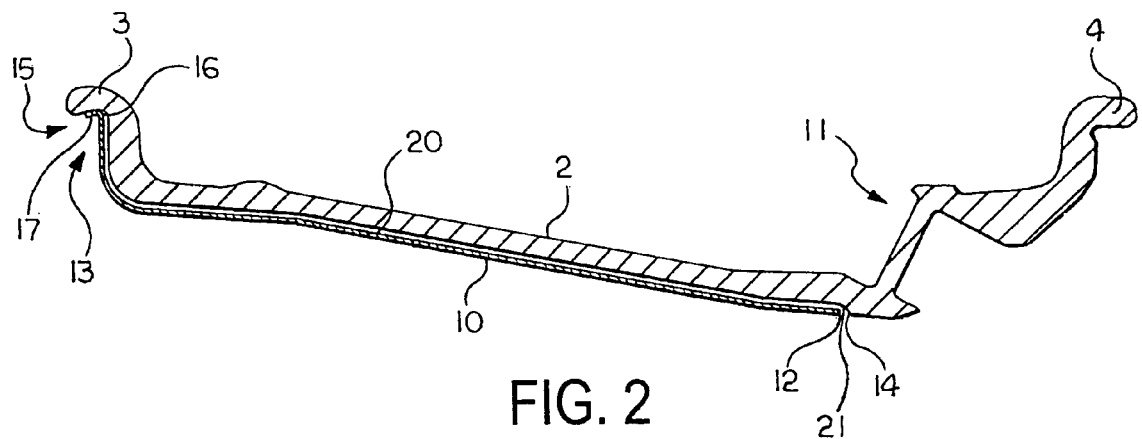
FIG. 2 is a cross-sectional side partial view of a wheel assembly according to one embodiment of the present invention.

FIG. 2 is a cross-sectional side partial view of a wheel assembly according to one embodiment of the present invention. FIG. 2 shows a cross-section of the mounting rim 2 of a wheel 1 and the inboard and outboard rim flanges 3 and 4. As shown in FIG. 2 the mounting rim 2 includes a stepped portion 11 adjacent the outboard rim flange 4 which is a common design feature of many decorative wheels.

In the wheel assembly of FIG. 2 an inner end 12 of the shield 10 extends to the stepped portion 11 of the mounting rim 2 and an outer end 13 of the shield 10 extends below the inboard rim flange 3 as shown. A stepped recess 14 is provided in the inner surface of the wheel 1 where the inner end 12 of the shield 10 is to be located. The stepped recess 14 allows the shield 10 to be flat or flush with the adjacent non-stepped area which can allow better sealing against ingress of water and debris between the shield 10 and the wheel 1.

The wheel assembly of FIG. 2 includes a rim locking mechanism generally identified by reference numeral 15. The rim locking mechanism 15 includes a recess 16 that is provided in the bottom of the inboard rim flange 3 which is configured to engage a lip or flange 17 that is formed on the outer end 13 of the shield 10. Due to the configuration of the recess 16 and lip or flange 17 of the shield 10 and the annular shape of the shield 10 when inserted in wheel 1, there is a radial biasing force that urges the lip or flange 17 into radial contact with the inboard rim flange 3. Because the recess 16 is slightly tapered inward and the lip or flange 17 is complimentarily formed and otherwise deflected with a taper or slant as exemplified in FIG. 2, the lip or flange 17 of the shield 10 tends to slide under the biasing force in such a manner to push the shield 10 into the wheel 1 toward the stepped recess 14. According to one embodiment of the present invention dimensional tolerances are provided in the configuration of the wheel 1 and shield 10 so that there is a slight clearance or gap 20 between the shield 10 and the inner surface of the mounting rim 2, and a clearance or gap 21 between the inner end 12 of shield 10 and stepped recess 14. The clearance or gap 20 between the shield 10 and the wheel 1 and between the inner end 12 of the shield and the stepped recess 14 can be up to a millimeter or more allows for thermo expansion of the shield 10. An adhesive or sealant can be patterned in the clearance or gap 20 between the shield and inner surface of the wheel so as to secure the shield 10 to the wheel 1 and provide a cushioning function whereby the force of debris impact can be primarily be absorbed by the shield 10 before reaching the underlying wheel 1. The adhesive or sealant can also be in or near the clearance or gap 21 between the inner end 12 of the shield 10 and the stepped recess 14 in order to prevent moisture and debris from engrossing between the shield 10 and the wheel 1 at this area.

Figure 3:
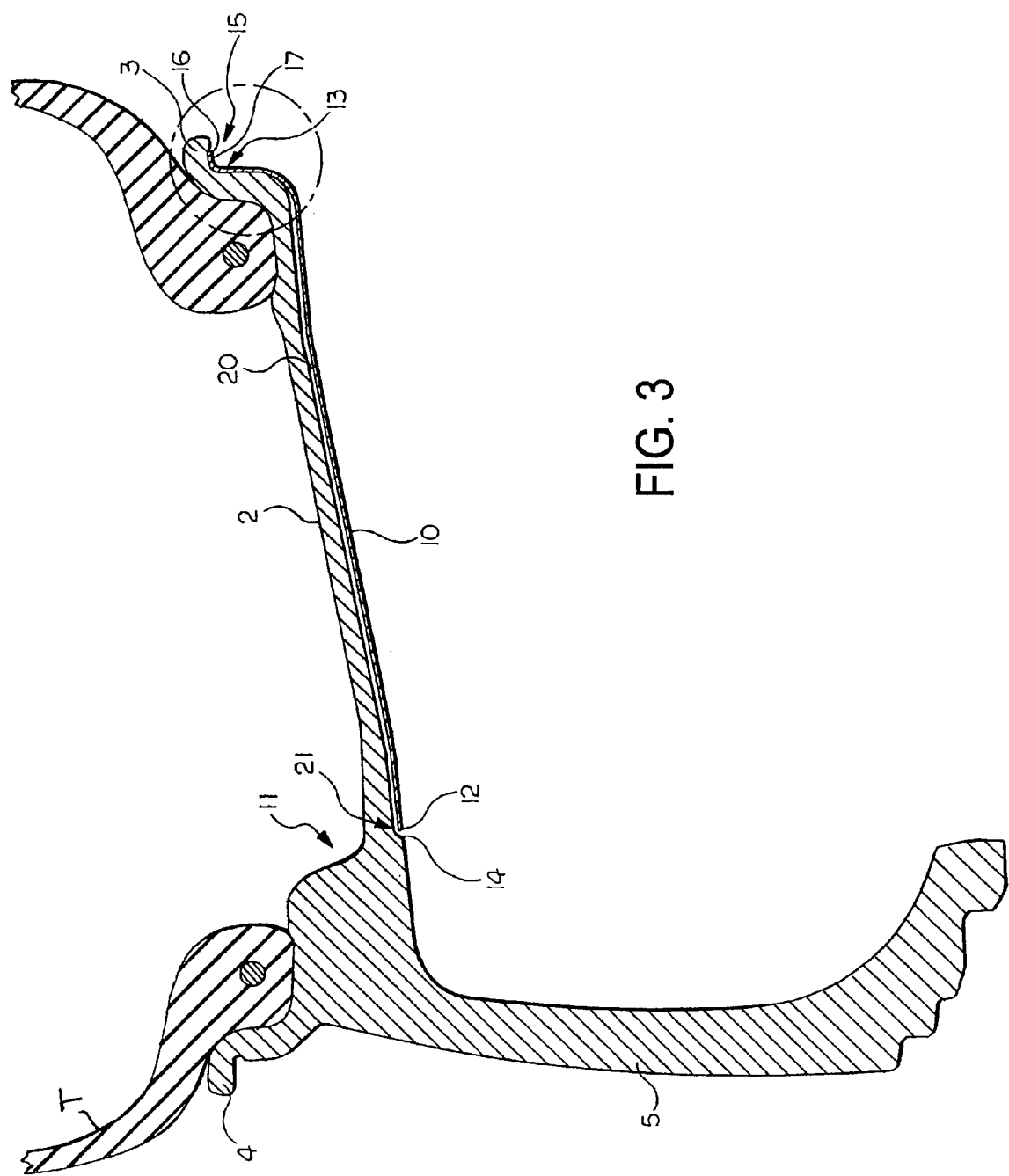
FIG. 3 is a cross-sectional side partial view of a wheel assembly according to another embodiment of the present invention.

FIG. 3 is a cross-sectional side partial view of a wheel assembly according to another embodiment of the present invention. The wheel assembly in FIG. 3 shows a raised outboard surface of the wheel 1 which corresponds to a spoke 5 which is part of the decorative wheel design. In FIG. 3, a shield 10 is provided that has an inner end 12 that extends to the stepped portion 11 of the mounting rim 2 and the outer end 13 of the shield 10 extends below the inboard rim flange 3 as shown. A stepped recess 14 is provided in the inner surface of the wheel 1 where the inner end 12 of the shield 10 is to be located. The stepped recess 14 allows the shield 10 to be flat or flush with the adjacent non-stepped area which can allow better sealing against ingress of water and debris. As in the case of the wheel assembly of FIG. 2, a clearance or gap 20 is provided between the shield 10 and the inner surface of the mounting rim 2 in FIG. 3. This clearance or gap 20 can be up to a millimeter or more so as to allow for thermo expansion of the shield 10. A similar a clearance or gap 21 can be provided between the inner end 12 of shield 10 and stepped recess 14 to accommodate thermal dimensional changes. An adhesive or sealant 24 can be patterned in the clearance between the shield 10 and inner surface of the wheel 1 so as to secure the shield 10 to the wheel 1 and provide a cushioning function whereby the force of debris impact can be primarily be absorbed by the shield 10 before reaching the underlying wheel 1.

The wheel assembly of FIG. 3 includes a rim locking mechanism 15 which includes a recess 16 that is provided in the bottom of the inboard rim flange 3 which recess 16 is configured to engage a lip or flange 17 that is formed on the outer end 13 of the shield 10. The configuration of the rim locking mechanism 15 of the wheel assembly depicted in FIG. 3 is slightly different from the rim locking mechanism 15 of the wheel assembly depicted in FIG. 2 as discussed below.

Figure 4:
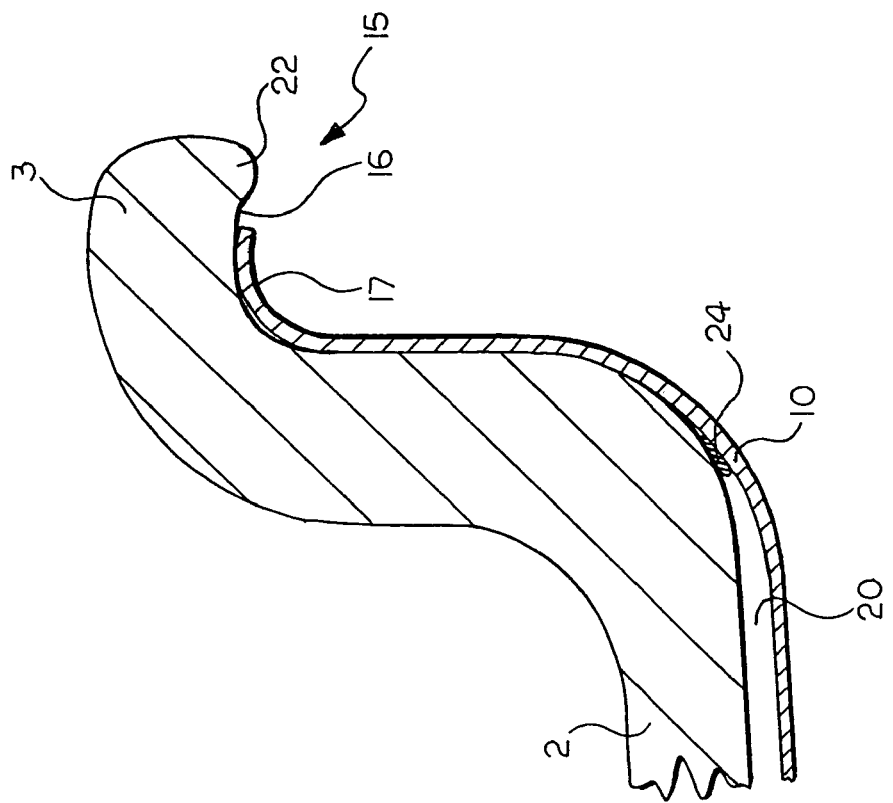
FIG. 4 is an enlarged view of the section "A" of FIG. 3.

FIG. 4 is an enlarged view of the section "A" of FIG. 3. As shown in FIG. 4 the rim locking mechanism of FIG. 3 which is generally identified by reference numeral 15 includes a recess 16 that is formed in the bottom of the inboard rim flange 3. In the embodiment of the invention shown in FIG. 3, the recess 16 is defined by a protrusion 22 that is formed on the bottom of the inboard rim flange 3 at the edge thereof. As also shown in FIG. 4 the lip or flange 17 on the outer end 13 of the shield 10 has a curved shape rather than an angled shape as shown in FIG. 2. Because of the curved configuration of the protrusion 22 formed on the bottom of the inboard rim flange 3 and the curved configuration of the lip or flange 17 on the outer end 13 of the shield 10, when the shield 10 is inserted into a wheel 1 the curved lip or flange 17 on the outer end 13 of the shield 10 engages the protrusion 22 formed on the bottom of the inboard rim flange 3 and is deflected downward as illustrated in FIG. 5.

Figure 5:
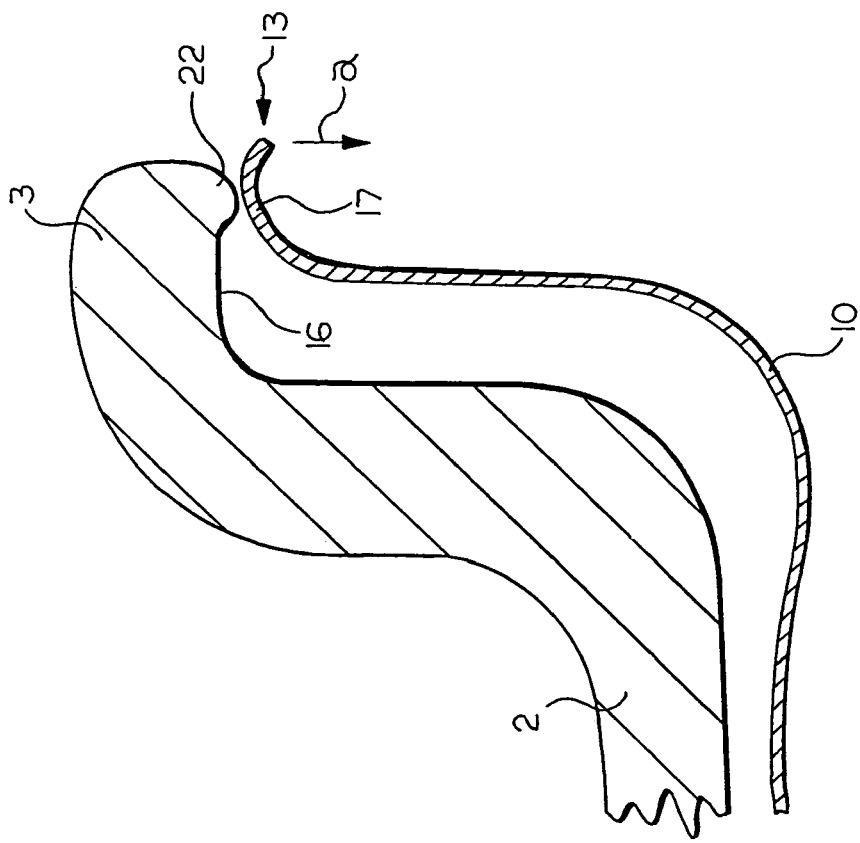
FIG. 5 is a view similar to FIG. 4 which illustrates how the lip or flange on the outer end of the shield interacts with protrusion formed on the bottom of the inboard rim flange.

FIG. 5 is a view similar to FIG. 4 which illustrates how the lip or flange on the outer end of the shield interacts with protrusion formed on the bottom of the inboard rim flange. As depicted, the shield 10 is deflected downward in the direction of arrow "a" as the shield 10 is inserted into the wheel 1 and the lip or flange 17 on the outer end 13 of the shield 10 interacts with protrusion 22 formed on the bottom of the inboard rim flange 3. Once the shield 10 is inserted further into the wheel 1 the lip or flange 17 on the outer end 13 of the shield 10 passes by the protrusion 22 formed on the bottom of the inboard rim flange 3 and "springs" back into the recess 16 as depicted in FIG. 4. The "springing" of the end 13 of the shield 10 provides a snap-fit function which locks the shield 10 in place. Once the shield 10 is in the position depicted in FIG. 4, engagement or abutment of the lip or flange 17 on the outer end 13 of the shield 10 with protrusion 22 formed on the bottom of the inboard rim flange 3 will prevent the shield 10 from coming out of the wheel 1.

An adhesive or sealant 24 (See FIG. 4) is provided between the shield 10 and inner surface of the wheel 1 as shown in FIG. 4. The adhesive or sealant 24 can be provided as a continuous layer between all or part of the area between the shield 10 and the inner surface of the wheel 1 or in any desired pattern. Conventional temperature resistant adhesives which are used in wheel cladding assemblies can be used and are known to those skilled in the art of wheel assemblies.

The lip or flange 17 on the outer ends 13 of the shields 10 can be continuous structures that have annular shapes or discrete structures that are circumferentially spaced apart at the outer ends 13 of the shields 10. In other embodiments of the invention both the lips or flanges 17 on the outer ends 13 of the shields 10 and the protrusions 22 can be discrete structures. In such embodiments the shields 10 can be snap-fit into position as discussed above or the discrete lips or flanges 17 and discrete protrusions 22 can be misaligned so as not to engage when the shields 10 are inserted into the wheels 1 and then turned to be aligned and locked into position by their engagement or abutment similar to a bayonet mounting structure.

Other locking or securing configurations and means can be used to secure the shield along the interior surface of the mounting rims rim of the wheels, including the sole use of an adhesive or sealant.

Figure 6:
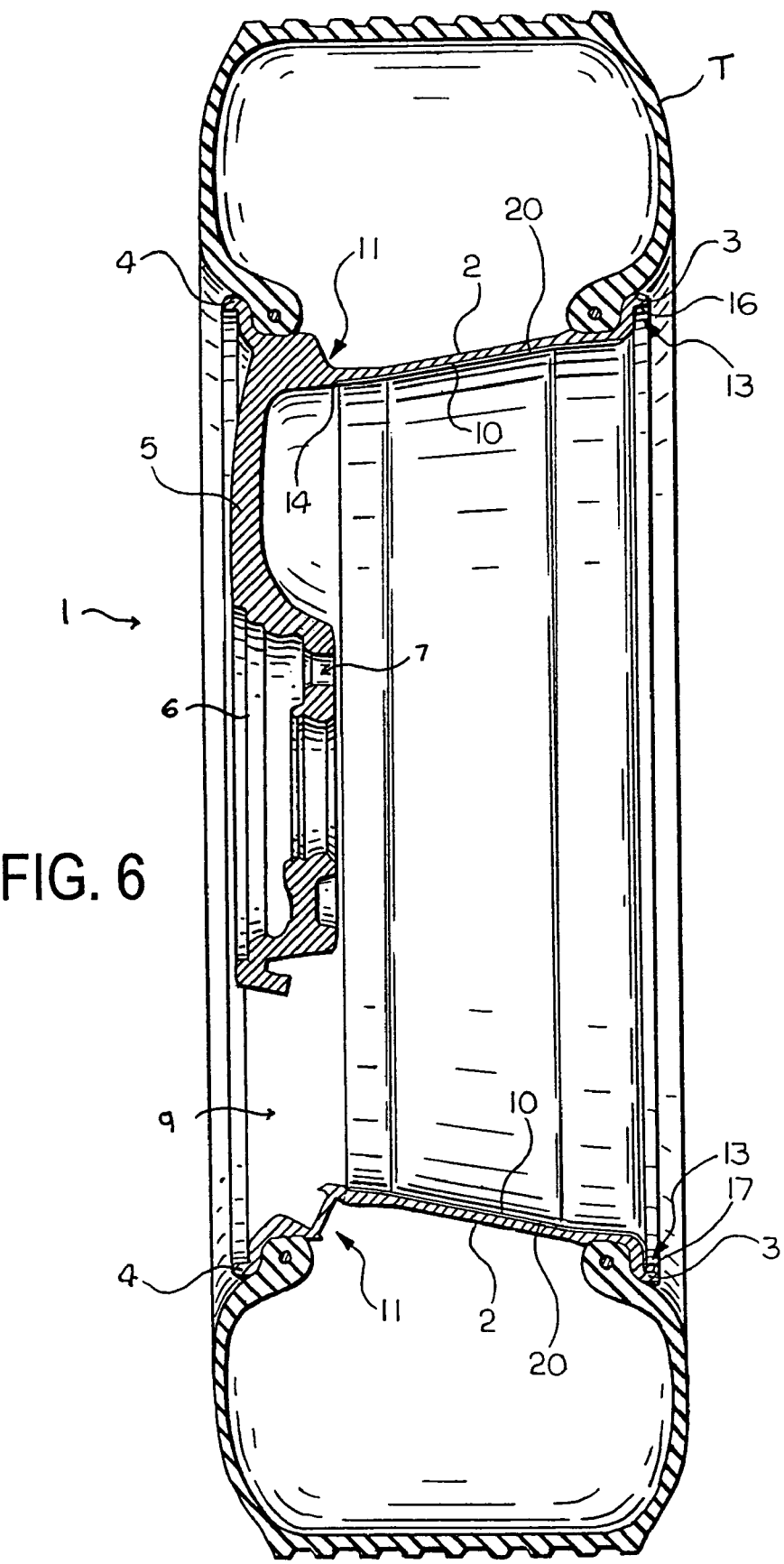
FIG. 6 is a cross-sectional side view of the wheel assembly of FIG. 3.

FIG. 6 is a cross-sectional side view of the wheel assembly of FIG. 3 and is provided to depict the overall wheel assembly. FIG. 6 depicts how a tire "T" is mounted on mounting rim 2 between inboard flange 3 and outboard flange 4. In addition, FIG. 6 provides a reference view of the shield 10 with respect to the inboard (right-hand side) and outboard (left-hand side) sides of the wheel assembly. The outboard side of the wheel 1 includes a spoke 5 which extends radially from a central hub area 6 that has a plurality of through-holes 7 which are aligned to receive the lug bolts of a vehicle wheel hub assembly (not shown) when the wheel 1 is mounted to a vehicle. Below spoke 5 in FIG. 6 is a brake vent opening 9. The details of how the shield 10 is secured in wheel 1 of FIG. 6 are discussed above in reference to FIG. 3.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and set forth in the attached claims

What is claimed is:

1. A wheel assembly that comprises:
   a wheel having an outboard surface that includes a central hub area, an inboard flange and an outboard flange and a mounting rim that extends between the inboard flange and the outboard flange which mounting rim has an axial center, said mounting rim further having a radially outer surface and a radially inward surface; and
   a protective shield that comprises a band of metal that lines at least an annular portion of the inner surface of the mounting rim axially inward from said outboard surface and across the axial center of the mounting rim to shield the inner surface of the mounting rim; and
   at least one of a mechanical locking arrangement and a chemical agent which secures the shield along the inner surface of the mounting rim.

2. A wheel assembly according to claim 1, wherein the shield is secured along the inner surface of the mounting rim by a mechanical locking arrangement.

3. A wheel assembly according to claim 2, wherein the mechanical locking arrangement comprises a snap-fit mechanism.

4. A wheel assembly according to claim 1, wherein the mechanical locking arrangement comprises at least one of a recess and a protrusion provided on a bottom portion of the outer rim flange.

5. A wheel assembly according to claim 4, wherein the shield includes an outer end and the mechanical locking arrangement further comprises a lip or flange formed on outer end of the shield which lip or flange engages the at least one of a recess and protrusion provided on a bottom portion of the outer rim flange.

6. A wheel assembly according to claim 1, wherein the wheel is made of aluminum and the shield is made of made of stainless steel.

7. A wheel assembly according to claim 1, wherein the chemical agent is one of an adhesive and a sealant.

8. A wheel assembly according to claim 2, wherein the shield is secured along the inner surface of the mounting rim by a mechanical locking arrangement and by a chemical agent.

9. A wheel assembly according to claim 1, wherein the inner surface of the mounting rim includes a recess for receiving at least a portion of the shield therein.

10. A wheel assembly that comprises:
    a wheel having an inboard flange and an outboard flange and an inner annular surface that extends between the inboard flange and the outboard flange which inner annular surface has an axial center and an outboard surface that includes a central hub area;
    a shield that comprises a band of metal that is configured to line at least a portion of the inner annular surface of the wheel inward from the outboard surface and across the axial center of the inner annular surface to shield the inner annular surface of the wheel; and
    at least one of a mechanical locking arrangement and a chemical agent which secures the shield along the inner annular surface of the wheel.

11. A wheel assembly according to claim 10, wherein the wheel is made or aluminum and the shield is made of stainless steel.

12. A wheel assembly according to claim 10, wherein the shield is secured along the inner annular surface of the wheel by a mechanical locking arrangement.

13. A wheel assembly according to claim 12, wherein the mechanical locking arrangement comprises a snap-fit mechanism.

14. A wheel assembly according to claim 10, wherein the mechanical locking arrangement comprises at least one of a recess and a protrusion provided on a bottom portion of the inboard rim flange and a lip or flange formed on an outer end of the shield which lip or flange engages the at least one of a recess and protrusion provided on a bottom portion of the inboard rim flange.

15. A wheel assembly according to claim 10, wherein the shield is secured along the inner surface of the wheel by a mechanical locking arrangement and by a chemical agent.

16. A method of shielding an inner surface of a wheel which comprises:
    providing a wheel having an inboard flange and an outboard flange and an inner annular that extends between the inboard flange and the outboard flange which inner annular surface has an axial center and an outboard surface that includes a central hub area;
    providing a shield that comprises a band of metal that is configured to line at least a portion of the inner annular surface of the wheel including across the axial center of the inner annular surface to shield the inner annular surface of the wheel; and
    securing the shield along the inner annular surface of the wheel inward from the outboard surface by at least one of a mechanical locking arrangement and a chemical agent.

17. A method of shielding an inner surface of a wheel according to claim 16, wherein the wheel is made of aluminum and the shield is made of stainless steel.

18. A method of shielding an inner surface of a wheel according to claim 17, wherein the mechanical locking arrangement comprises a snap-fit mechanism.

19. A method of shielding an inner surface of a wheel according to claim 17, wherein the mechanical locking arrangement comprises at least one of a recess and a protrusion provided on a bottom portion of the inboard rim flange and a lip or flange formed on an outer end of the shield which lip or flange engages the at least one of a recess and protrusion provided on a bottom portion of the inboard rim flange.

20. A method of forming a wheel assembly which comprises:
    providing a wheel having and inboard flange and an outboard flange and an inner annular surface that extends between the inboard flange and the outboard flange which inner annular surface has an axial center and an outboard surface that includes a central hub area;
    providing a shield that comprises a band of metal that is configured to line at least a portion of the inner annular surface of the wheel and extend across the axial center of the inner annular surface to shield the inner annular surface of the wheel; and
    securing the shield along the inner annular surface of the wheel inward from the outboard surface by at least one of a mechanical locking arrangement and a chemical agent.

21. A method of forming a wheel assembly according to claim 20, wherein the wheel is made of aluminum and the shield is made of stainless steel.

22. A method of forming a wheel assembly according to claim 20, wherein the mechanical locking arrangement comprises a snap-fit mechanism.

23. A method of forming a wheel assembly according to claim 20, wherein the mechanical locking arrangement comprises at least one of a recess and a protrusion provided on a bottom portion of the inboard rim flange and a lip or flange formed on an outer end of the shield which lip or flange engages the at least one of a recess and protrusion provided on a bottom portion of the inboard rim flange.

24. In a wheel assembly for vehicles that includes an aluminum wheel having inboard and outboard rim flange and an inner annular surface that extends between the inboard flange and the outboard flange and includes an axial center and an outboard surface that includes a central hub area and a mounting flange the improvement comprising a metal shield that is positioned along the inner annular surface of the wheel inward from the outboard surface and extends across the axial center of the inner annular surface and is secured by at least one of a mechanical locking arrangement and a chemical agent.

25. The wheel of claim 24, wherein the metal shield is made of stainless steel.

26. The wheel of claim 24, wherein the mechanical locking arrangement comprises a recess that is provided at a bottom portion of the inboard rim flange and an outer end of the metal shield that is configured to engage in the recess.

27. The wheel of claim 26, wherein the outer end of the metal shield is biased to engage the recess.

28. The wheel of claim 27, wherein the recess is defined by a protrusion provided on at a bottom portion of the inboard rim flange.

* * * * *